United States Patent
Bohli et al.

(10) Patent No.: US 10,397,328 B2
(45) Date of Patent: Aug. 27, 2019

(54) METHOD AND SYSTEM FOR PROVIDING A ROBUST BLOCKCHAIN WITH AN INTEGRATED PROOF OF STORAGE

(71) Applicant: NEC Europe Ltd., Heidelberg (DE)

(72) Inventors: Jens-Matthias Bohli, Leimen (DE); Wenting Li, Heidelberg (DE); Ghassan Karame, Heidelberg (DE); Frederik Armknecht, Worms (DE)

(73) Assignee: NEC CORPORATION, Tokyo (JP)

( * ) Notice: Subject to any disclaimer, the term of this patent is extended or adjusted under 35 U.S.C. 154(b) by 273 days.

(21) Appl. No.: 15/640,604

(22) Filed: Jul. 3, 2017

(65) Prior Publication Data
US 2018/0336552 A1  Nov. 22, 2018

Related U.S. Application Data

(60) Provisional application No. 62/507,247, filed on May 17, 2017.

(51) Int. Cl.
| | | |
|---|---|---|
| *H04L 29/08* | (2006.01) | |
| *G06Q 20/38* | (2012.01) | |
| *G06F 21/64* | (2013.01) | |
| *G06F 21/62* | (2013.01) | |
| *H04L 9/32* | (2006.01) | |

(52) U.S. Cl.
CPC ...... *H04L 67/1097* (2013.01); *G06F 21/6254* (2013.01); *G06F 21/64* (2013.01); *G06Q 20/382* (2013.01); *G06Q 20/389* (2013.01); *H04L 9/3236* (2013.01); *H04L 9/3297* (2013.01); *H04L 67/1095* (2013.01); *G06Q 2220/10* (2013.01); *G06Q 2220/16* (2013.01); *G06Q 2220/165* (2013.01); *H04L 2209/38* (2013.01)

(58) Field of Classification Search
CPC .. G06Q 20/389; G06Q 20/382; H04L 9/3236; H04L 9/3297; H04L 2209/38; H04L 67/1095; H04L 67/1097; G06F 21/64
See application file for complete search history.

(56) References Cited

U.S. PATENT DOCUMENTS

| | | | |
|---|---|---|---|
| 8,381,062 B1 * | 2/2013 | Juels | H04L 9/3221 714/752 |
| 2018/0145836 A1 * | 5/2018 | Saur | G06Q 20/3829 |

OTHER PUBLICATIONS

Vorick, David, and Luke Champine. "Sia: Simple decentralized storage." White paper available at https://assets.coss.io/documents/white-papers/siacoin.pdf. (Year: 2014).*

(Continued)

*Primary Examiner* — Robert B Leung
(74) *Attorney, Agent, or Firm* — Leydig, Voit & Mayer, Ltd.

(57) ABSTRACT

A method for integrating a Proof of Storage (PoS) into a blockchain increases security, robustness and verifiability of a blockchain network. A part of the blockchain to be stored is received at a first one of a plurality of mining nodes of the blockchain network. The part of the blockchain is stored. Mining of the new block is bound to the stored data and performed so as to enforce that the mining nodes store different parts of the blockchain. The PoS is integrated into the new block. The PoS is verified before accepting the new block into the blockchain.

15 Claims, 7 Drawing Sheets

(56) References Cited

OTHER PUBLICATIONS

Wilkinson, Shawn, Jim Lowry, and Tome Boshevski. "Metadisk a blockchain-based decentralized file storage application." Storj Labs Inc., Technical Report. (Year: 2014).*
Sengupta, Binanda, Samiran Bag, Sushmita Ruj, and Kouichi Sakurai. "Retricoin: Bitcoin based on compact proofs of retrievability." In Proceedings of the 17th International Conference on Distributed Computing and Networking, p. 14. ACM, 2016. (Year: 2016).*
Mukhopadhyay, Ujan, Anthony Skjellum, Oluwakemi Hambolu, Jon Oakley, Lu Yu, and Richard Brooks. "A brief survey of cryptocurrency systems." In 2016 14th annual conference on privacy, security and trust (PST), pp. 745-752. IEEE, Dec. 2016. (Year: 2016).*
Patel, Dhiren, Jay Bothra, and Vasudev Patel. "Blockchain exhumed." In 2017 ISEA Asia Security and Privacy (ISEASP), pp. 1-12. IEEE, Jan. 2017. (Year: 2017).*
Kopp, Henning, David Mödinger, Franz Hauck, Frank Kargl, and Christoph Bösch. "Design of a privacy-preserving decentralized file storage with financial incentives." In 2017 IEEE European Symposium on Security and Privacy Workshops (EuroS&PW), pp. 14-22. IEEE, Apr. 2017. (Year: 2017).*
Tschorsch, Florian and Björn Scheuermann. "Bitcoin and Beyond: A Technical Survey on Decentralized Digital Currencies." In 2016 IEEE Communications Surveys & Tutorials, vol. 18, No. 3, pp. 2084-2123. 2016. (Year: 2016).*
Andrew Miller, et al., "Permacoin: Repurposing Bitcoin Work for Data Preservation", 2014 IEEE Symposium on Security and Privacy, May 18-21, 2014, pp. 475-490.

\* cited by examiner

METHOD AND SYSTEM FOR PROVIDING A ROBUST BLOCKCHAIN WITH AN INTEGRATED PROOF OF STORAGE

CROSS-REFERENCE TO PRIOR APPLICATION

Priority is claimed to U.S. Provisional Patent Application No. 62/507,247, filed on May 17, 2017, the entire disclosure of which is hereby incorporated by reference herein.

FIELD

The present invention relates to a method and system for providing a more secure and robust blockchain and for protecting and verifying blockchain data.

BACKGROUND

In spite of constant skepticism, Bitcoin has grown to witness a wider adoption and attention than any other digital currency proposed to date. Currently, Bitcoin holds the largest market share among all existing digital currencies, with a market cap of a few billion USD. Bitcoin's exchange rate also recently sharply rose over most fiat currencies with significant additional rise expected in the coming few years. Bitcoin implements a novel distributed consensus scheme based on Proof of Work (PoW) that scales to a large number of nodes. Here, participants "vote" with their computing power which effectively limits the power of individual users and makes Sybil attacks difficult. The sustainability of the Bitcoin system has been aided by large investments made by several mainstream companies in large data centers that are equipped with dedicated PoW mining capabilities. In spite of its huge energy consumption and low performance, PoW currently accounts for more than 90% of the total market capitalization of existing digital cryptocurrencies and is being used in Bitcoin, Litecoin, Dogecoin and Ethereum. This is probably due in part to the considerable investments that have been carried out in hash-based mining dedicated machinery. Based on recent events, it is clear that drastic changes to the rules governing the dynamics of the PoW ecosystem will be widely resisted by the backing industry.

The process of mining for a given set of transactions T and given the hash Bl of the previous block at a certain point in time t requires to determine a nonce value nonce such that $H(Bl; T; t; nonce)$ fulfils a certain condition, typically, being smaller than a given difficulty threshold. $H(Bl; T; t; nonce) < difficulty$. Here, H is a hash function defined in the blockchain protocol.

The current difficulty level of PoW mining is so prohibitively high that it reduces the incentives for miners to operate solo. In view of this, miners often work together in mining pools. In the context of mining pools, however, the members are not actually miners, but so-called workers because, unlike a miner, they do not store any part of the blockchain. Rather, only the operator of the mining pool stores the full blockchain. Joining a mining pool is an attractive option to receive a portion of a block reward on a consistent basis. Rewards are then shared between the members (i.e., workers) of the mining pools based on the computational resources that they commit. There are currently a number of models for profit sharing in mining pools, such as Pay-per-Share (PPS), Pay-per-last-N-Shares (PPLNS), among others. In all these models, workers do not connect to the blockchain; instead, they are typically required to solve a PoW with a reduced difficulty that is determined by the pool operator.

Although profitable, mining pools are a clear departure from the original model outlined in Nakamoto's whitepaper. In mining pools, workers are incentivized to obtain a block reward and do not have any incentives to store the blockchain, nor to operate a full Bitcoin node. In fact, most existing workers run specific mining protocols, such as Stratum mining (STM) or GetBlockTemplate (GBT), in which they solve specific outsourced PoW puzzles without having to store any parts of the blockchain. Because blockchain security relies on the availability of all events (and their order of execution), the inventors have recognized that the lack of incentives to store the blockchain data poses a serious threat to the security and sustainability of the PoW-based blockchains.

As discussed by Miller, A., et al., in "Permacoin: Repurposing Bitcoin work for data preservation," Security and Privacy (SP), 2014 IEEE Symposium on, 475-490, there has been a sharp decrease in the number of full nodes that store the full blockchain and a considerable surge in the number of workers and lightweight blockchain clients, which only store a small subset of transactions. Also discussed are proposals for re-purposing of the PoW to, e.g., prove storage of archival data. Such re-purposing, although beneficial, would obviate the use of hash-optimized application-specific integrated circuit (ASICs) and field-programmable gate array (FPGAs) equipment (that have limited RAM and storage capabilities) and would require investments in storage-capable machinery (e.g., storage and exponentiation-optimized machinery).

SUMMARY

In an embodiment, the present invention provides a method for integrating a Proof of Storage (PoS) into a blockchain and for increasing security, robustness and verifiability of a blockchain network. A part of the blockchain to be stored is received at a first one of a plurality of mining nodes of the blockchain network. The part of the blockchain is stored. Mining of a new block is bound to the stored data and performed so as to enforce that the mining nodes store different parts of the blockchain. The PoS is integrated into the new block. The PoS is verified before accepting the new block into the blockchain.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The inventors have recognized that there is a lack of incentives to store the blockchain data which poses a serious threat to the security and sustainability of the Bitcoin system since PoW relies on the availability of blockchain data to nodes in the system. Blockchain data could be irreparably corrupted by Byzantine failures caused by accidents or targeted attacks. Also, in the current systems, the blockchain data cannot be verified with a high redundancy and is susceptible to errors and corruption by the operators who control the blockchain data. Accordingly, the present invention offers a more secure system, which is better protected against loss of data and corruption. Moreover, the blockchain data is more accurately verifiable. The availability of a robust blockchain brings benefits to systems that perform transactions over a computer network, such as banking, or devices in the Internet of Things.

In an embodiment, the present invention offers a solution to these problems. According to an embodiment of a system, also referred to herein as BitcoinPlus, the storing of blockchain data in the network is ensured and continuously verifiable by providing that miners must store parts of the blockchain in order to correctly solve a hash-based PoS puzzle. Unlike the proposals for re-purposing of a PoW, BitcoinPlus is fully compliant with the specifications of existing mining hardware. BitcoinPlus plugs an efficient in-memory hash-based provable data possession (PDP) scheme with Bitcoin's PoW mechanism to entangle the nonce with a non-interactive proof of (in-memory) storage of a small part of the blockchain. BitcoinPlus has been integrated within existing mining hardware and the results have shown that BitcoinPlus incurs tolerable overhead when compared to the standard mining in Bitcoin. By ensuring that individual workers store a small part of the blockchain, BitcoinPlus emerges as the first system to practically amortize the cost of dispersing the blockchain amongst various workers. BitcoinPlus is not particular to Bitcoin and equally applies to other PoW blockchains, such as Dogecoin, Litecoin, and Ethereum.

Accordingly, embodiments of the present application provide a robust blockchain which ensures that the full blockchain is stored with a high redundancy. By integrating a PoS of a part of the blockchain into a mined block, the storage redundancy is continuously verified by miners before a new block can be accepted. In this manner, miners cannot only provide computing power to mining pools, but rather have to contribute to the storage of the blockchain history.

One embodiment of a method for storing blockchain data with a PoS and verifying transactions using the stored blockchain data comprises selecting the blockchain data to store, conducting a proof of storage, and using a mining approach in line with the stored data and the PoS. The block rewards for the individual miners could be based on a size of the PoS.

Figure 1:
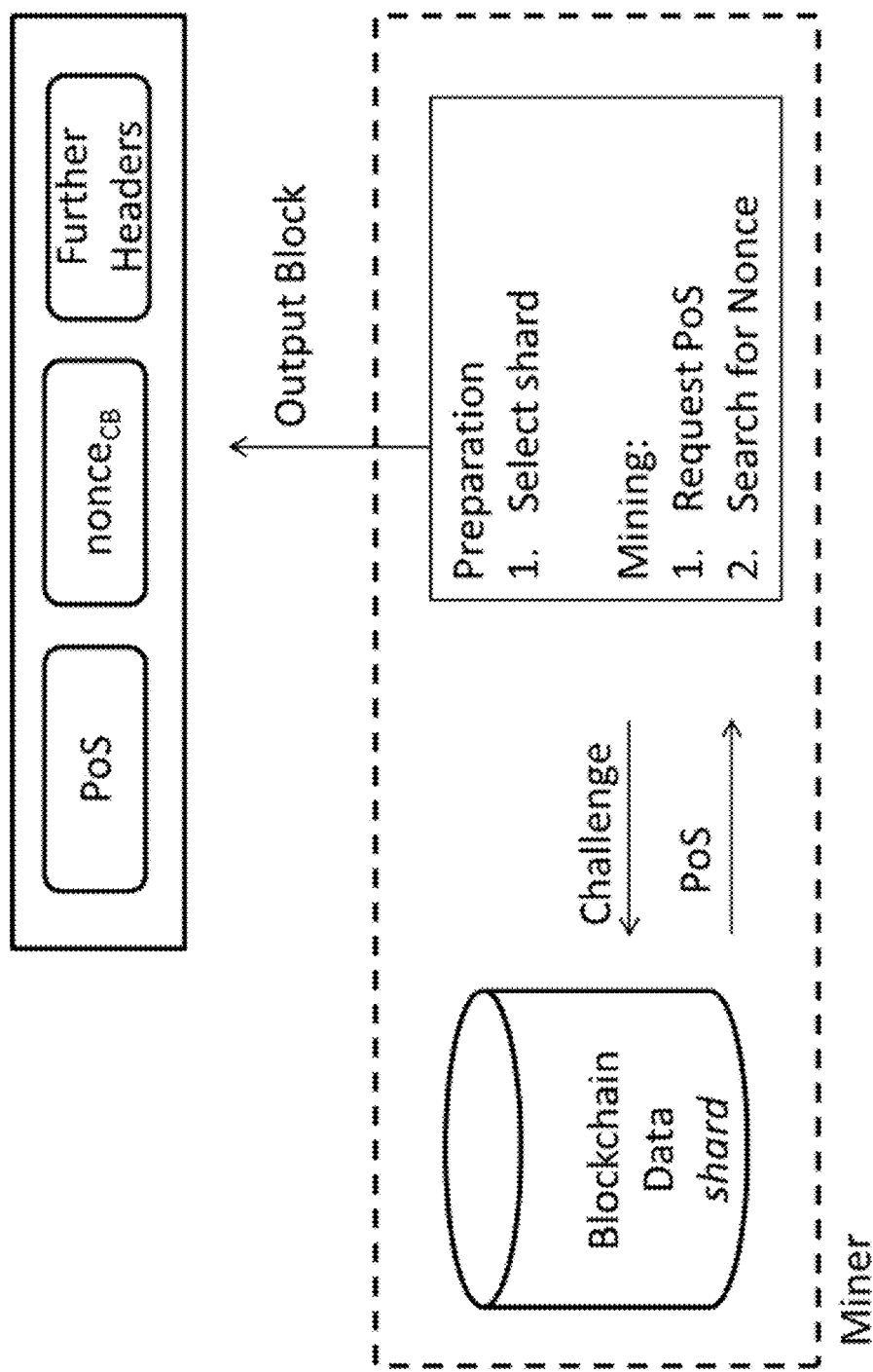
FIG. 1 is schematic overview of a mining node proctoring blockchain data and providing a PoS according to an embodiment of the present invention.

FIG. 1 schematically depicts a miner which comprises at least one mining node (shown diagrammatically in the dashed box) having one or more computer processors with access to memory for storing at least a part of the blockchain. First, each mining node selects part of the data of the blockchain that needs to be stored by that miner. This part is denoted by shard in the following. Preferably, the shard is selected by a value and/or identifier that is unique to the mining node. In this manner, the values or identifiers can be selected to ensure that the entire blockchain will be stored through the individual parts that are stored by the mining nodes. One embodiment is to base the selection on a seed placed in a special transaction that rewards the miner of a new block, referred to herein as a coinbase transaction. The seed should remain constant for an interval of time to prevent frequent changes in the storage of the miner (and therefore unnecessary overhead in the I/O and communication overhead of the miner). For the specific selection of the blocks, the coinbase transaction can then be used in a pseudo-random function to generate random index numbers that select the pieces of the blockchain that will be stored. The pseudo-random function ensures by statistical probability that the entire blockchain will be stored.

Secondly, before a mining for a nonce can take place, a PoS on the shard is conducted. To provide PoS as an input to the PoW, individual miners incorporate a challenge-response protocol to prove that they store (parts of) the blockchain data within the PoW. The challenge will select a subset of data in the shard, typically it will consist of a list of indices of blocks of the shard. A PoS consists of a pair PoS=(chl; res) with chl being a challenge and res being the corresponding response. The PoS will be included in the block.

According to an embodiment, the system is programmed to meet the following requirements:

chl is unpredictable to prevent precomputation of challenges and responses.

chl is tied to the individual miner belonging to the same operator.

chl preferably changes frequently to avoid the possibility of outsourcing the PoS.

The challenge can be computed using the stored shard and/or parts of the block to be mined as input, such as the coinbase transaction, the timestamp or possibly the nonce word.

The only parameters that are unpredictable are the previous block hash and the set of transactions. In order to provide a solution where each miner has to solve its own PoS, the coinbase transaction is included as well. Optionally, the timestamp can be relied on to define the frequency of renewing the PoS. Finally, since the size of the shard may be relevant (e.g., larger shards can use a longer challenge), the parameters that have selected the shard can also be included. The PoS is therefore a short fingerprint of the data that is selected by the challenge. The fingerprint can be computed by an XOR operation or using a hash function. In an advantageously simple embodiment, the nonce could be the challenge and the response just one particular block of the stored data that is selected by the nonce.

In order to make the PoS globally verifiable, an embodiment adds the amount of data stored by the miner shard, and the PoS into the block. In other words, the PoW now requires to solve a puzzle of the following form: HashFunction (Bl; T; t; PoS; nonce), wherein the shard is included in the PoS.

Finally mining of the block, i.e., searching for a nonce, is modified according to an embodiment. Colluding nodes that use the same seed experience a disadvantage in mining when compared to nodes that use different seeds. This ensures an independent selection of the seed. To satisfy the condition, the search domain is restricted. In a first embodiment, the reordering of transactions can only be done by the operator and the set where the nonce can be chosen from, for each individual miner, is set to be small. By doing so, each miner will have incentives to use a different seed in order to obtain an individual search domain, which increases the probability of solving a PoW. In a second embodiment, the reordering of transaction is a hash-based puzzle itself. Additionally the search for a nonce might serialized. By doing so, each miner will have incentives to use a different seed in order to obtain an individual search path, which increases the probability of solving a PoW.

Figure 2:
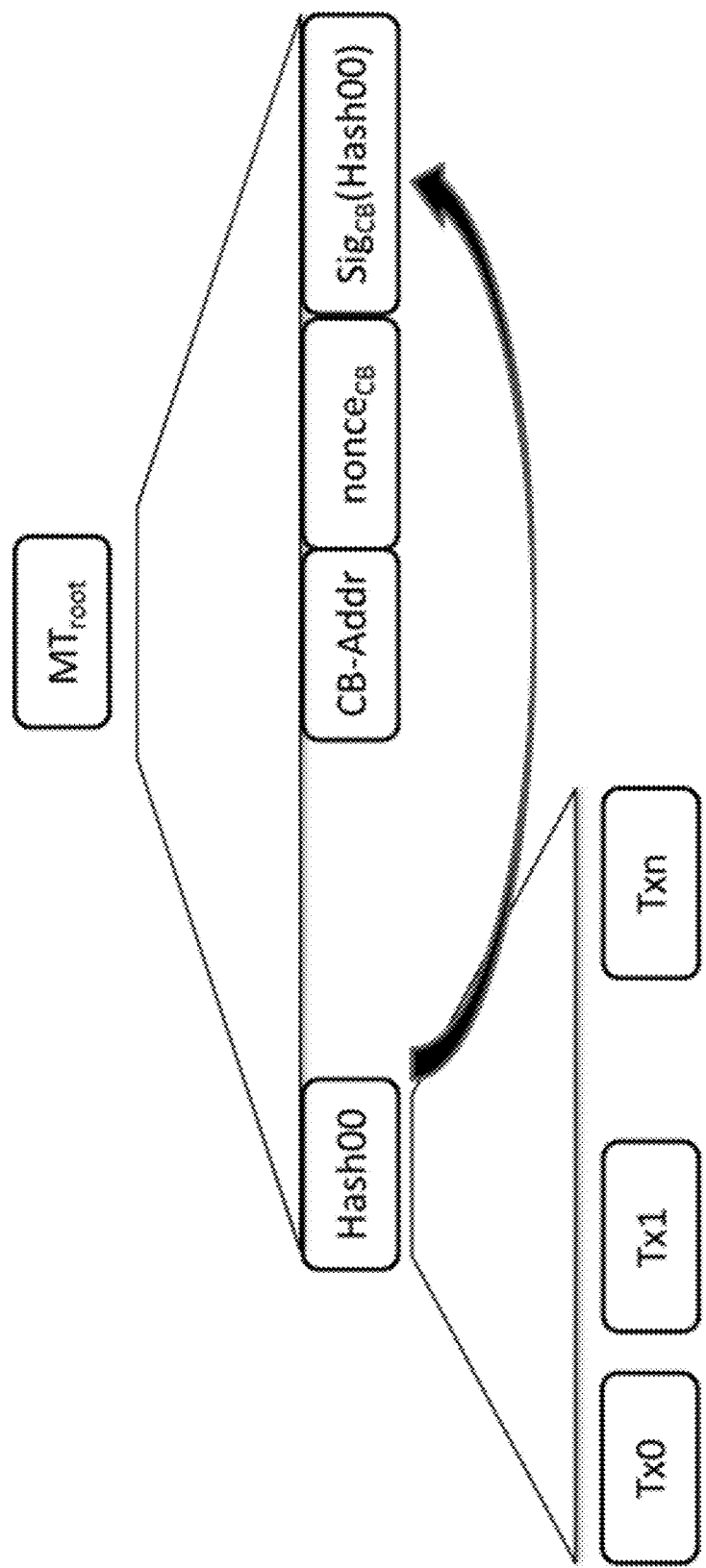
FIG. 2 is a schematic diagram showing the use of a set of transactions T signed by the operator ensuring that the miners include the same T when solving their PoW.

The core idea of the first embodiment is that the size of the domain is large enough so that searching for a PoW solution yields a correct solution with sufficient probability while at the same time reduces the benefits of different colluding miners to share the same exact domain. Notably, the problem of restricting the domain in existing PoW-based blockchains, such as Bitcoin, is further exacerbated by the fact that the domain of nonce is small. In these systems, workers often try to gain more flexibility by changing the order of transactions when comparing the Merkle Tree root MTroot (see FIG. 2). In particular, as T consists of an arbitrary number of transactions, it provides workers with a large search domain since it allows them to leave out transactions, create new transactions or reorder existing transactions. To prevent this, the first embodiment increases the difficulty borne on workers in forming a valid T (and hence the corresponding MTroot). More specifically, the first embodiment requires that T is signed by the mining pool operator. To avoid wasting valuable computing power, the operator preferably signs T only once and distributes the same T to all miners. As illustrated in FIG. 2, this ensures that different miners include the same T when solving their PoW. In the embodiment of FIG. 2, the set of transactions T cannot be arbitrarily chosen by the miner but must be accompanied by a signature provided by the pool operator.

The second embodiment for the mining process couples the computation of the Merkle Tree of transactions with the mining protocol. In particular, it is assumed that the non-adapted blockchain, i.e., the one based on a PoW only, is using the following PoW: given Bl, T, a current point in time t, and threshold $\delta$, find a nonce such that:

$$\text{HashFunction}(Bl; T; t; \text{nonce}) < \delta$$

Thus, the goal is to find a small hash function that is less than $\delta$. A difficulty $\Delta$ is already computed automatically in the blockchain protocol from the observation of the publishing times of the last blocks. The effort for solving this PoW is about $2^\Delta$ invocations of the hash function.

According to a particularly advantageous embodiment for increasing the security of the blockchain, each miner is restricted to their respective shard. This means that the processing of the PoW with respect to one shard cannot be parallelized. However, with respect to the PoW explained above, a miner has control over the following parameters: the selection and order of the considered transactions and the nonce. To avoid that a miner can freely "play" with the transactions, the sequence of transactions is restricted in the sense that only certain sets are finally accepted. Formally: Let $T=[tr_1, \ldots, tr_r]$ be a sequence of transactions, wherein T is valid with respect to a block Bl, a current point in time t, a coinbase CB, and a threshold $\delta$ if:

$$\text{HashFunction}(T, \text{nonce}) < 2\delta.$$

The first step in the process of mining a new block is thus to first find a valid sequence of transactions. The effort to find a valid sequence of transactions is about $2^{\Delta-1}$ invocations. Given that a valid sequence of transactions T* is found, the second phase in the solution finding process is initiated. This requires to find a nonce such that:

$$\text{HashFunction}(Bl, T^*, t, \text{nonce}) < 2\delta$$

The effort to do this is again about $2^{\Delta-1}$ hash invocations, so that the total effort is comparable to the effort of the original PoW.

An operator could still distribute the effort of finding an appropriate nonce among different miners. To address this possibility, according to an embodiment, the miners are forced to try the nonces in a predetermined order starting from the same, unique starting point. By doing so, any party who tries to solve the PoW has to execute the same actions, thereby advantageously eliminating any benefit in more than one party colluding or working on the same PoW.

In particular, an order on the nonces is assumed ($\text{nonce}_0$, $\text{nonce}_1$, ...) that are defined as follows:

$$\text{nonce}_1 = \text{HashFunction}(Bl, CB, T^*, t)$$

$$\text{nonce}_{i+1} = \text{HashFunction}(\text{nonce}_i) \text{ for } i \geq 2$$

Note that $\text{nonce}_{i+1}$ can only be computed if $\text{nonce}_i$ is known. Assuming a cryptographically secure hash function, this ensures that a miner has to compute the nonces exactly in this order. To avoid that a miner just uses a random nonce, the reward or verification can be conditioned on the index of the nonce being revealed in the solution as well. In the following, let nonce* denote a fitting nonce, i.e., being a value such that:

$$\text{HashFunction}(Bl, CB, PoS, T^*, t, \text{nonce}^*) < 2\delta.$$

The PoS is included in the block header and verified by all full nodes before being accepted. The coinbase is included in the transactions part of the block. The verification is done by determining the challenged blocks from the data in the block/block header and verifying the response given in the block/block header.

Embodiments of the present invention provide for at least one of the following advantages and inventive features:

1) Storing a part of the blockchain at each mining node, integrating a PoS into the mined block and verifying the PoS before accepting the block in the blockchain.
2) Selecting the blockchain subset to store from an extended coinbase transaction.
3) Deriving the challenge used in the PoS from the extended coinbase transaction and, optionally, the timestamp and part of the nonce of the block.
4) Binding the mining to the stored data to enforce storage of different parts of the blockchain by each miner by increasing the difficulty to find a suitable set of transactions. This can be done either by requiring a signature on the transaction set by the coinbase owner, or by an additional mining process, wherein a suitable set of transactions has to be mined, i.e., finding a nonce so that the hash value of the transaction set and the nonce is smaller than a value $\delta$. The miners can be forced to use a different coinbases. This avoids the possibility of the miners sharing the PoS.
5) Enforcing the same sequential search order on the nonce space for all miners in a mining pool.

According to one embodiment, a method for mining blocks in a blockchain with guaranteed storage of the blockchain comprises the steps of:

1) Storing a part of the full blockchain at each mining node in order for a respective miner to be able to mine a new block.
2) Executing a PoS of the blockchain during mining a new block.
3) Binding the mining to the stored data to enforce storage of different parts by each miner.
4) Verifying the PoS before accepting the new block into the blockchain.

In the following, another embodiment of the present invention, referred to herein as PoWeR, is described. PoWeR advantageously results in increased storage and security of the blockchain in the network by effectively dividing the blockchain into shards and requiring workers to locally store different shards, or parts of the blockchain, in order to correctly solve a standard hash-based PoW. PoWeR does not incur any modification to PoW headers, is fully compliant with the specifications of existing mining hardware, and only incurs minor changes to the existing PoW protocols. This makes it more attractive for adoption within an existing PoW ecosystem. PoWeR plugs an efficient in-memory proof of knowledge into a hash-based PoW mechanism to force workers to store (in-memory) a modest (but fixed) shard of the blockchain data. PoWeR can be integrated within existing mining pool protocols, such as GBT and STM, without requiring any modification to these protocols.

By ensuring that individual workers store a small part of the blockchain, PoWeR emerges as the first workable solution to provide for security and storage of the blockchain, with incentives for storage, and to practically amortize the costs of dispersing the blockchain data amongst various workers.

PoWeR provides a number of contributions and improvements to the blockchain network. First, a formal framework and a security model for a PoW is provided that incentivizes storage of parts of the blockchain data. The model, also referred to herein as p-covering blockchain, extends the existing model of PoW and enforces security risks that have not been covered so far by requiring that each worker independently stores a fraction p of the blockchain data. Second, a concrete scheme, also referred to herein as PoWeR, is provided which extends existing mining protocols with efficient in-memory proofs of knowledge and couples them with a standard PoW mechanism. PoWeR leverages two interconnected phases: in the first phase, the workers reach consensus on the exact set (including order) of transactions to be confirmed in a given block. In the second phase, the workers solve a proof of work instantiation based on this set of transactions that is entangled with a proof of work over their specific shard. Advantageously, PoWeR is particularly secure in the generic p-covering model. A prototype based on PoWeR using Graphics Processing Unit (GPU) mining has been implemented and has been integrated with STM and GBT. The results show that PoWeR, while increasing security, does not require nor solicit changes in existing mining hardware, and does not impair the mining efficiency of STM and GBT.

PoW-based blockchains currently account for 90% of the capitalization of existing digital cryptocurrencies and is being used in Bitcoin, Litecoin, Dogecoin, and Ethereum. In these deployments, PoW serve as a public timestamping mechanism that aims to prevent double-spending attacks. Namely, digital transactions are included in blocks that are broadcasted in the entire network. Although perfect synchronization within the network is not required, the parties are assumed to be loosely synchronized. To prevent double-spending of the same coin, PoW-based cryptocurrencies rely on the synchronous communication assumption along with a hash-based PoW concept. More specifically, to generate a block, miners must find a block header that represents the solution of a PoW, i.e., when hashed, the result fulfills a certain criterion; for instance, it must be below a given target value (informally H(blockheader)≤target.) If such a block header is found, miners then include it (as well as the additional fields) in a new block thus allowing any entity to verify the PoW. Upon successfully generating a block, a miner is granted a monetary reward (i.e., in the form of a coinbase transaction). The resulting block is forwarded to all peers in the network, who can then check its correctness by verifying the hash computation. If the block is deemed to be "valid" (or the block contains correctly formed transactions that have not been previously spent, and has a correct PoW), then blockchain nodes append it to their previously accepted blocks. Since each block links to the previously generated block, the Bitcoin blockchain grows upon the generation of a new block in the network.

Figure 3:
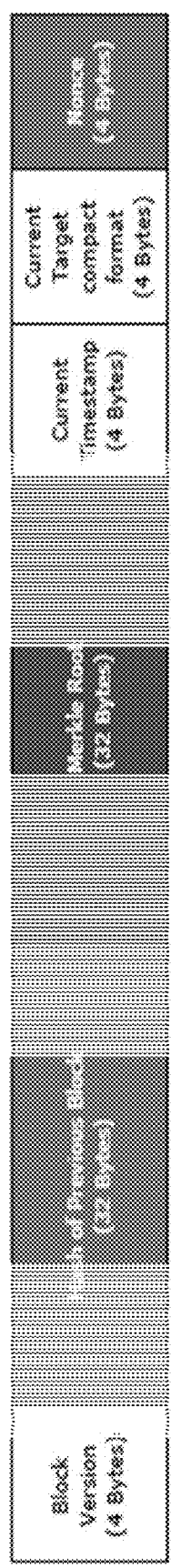
FIG. 3 is a sketch of an adapted PoW block header structure in Bitcoin, showing only the information relevant for an embodiment of the present invention.

An example of a Bitcoin block header is depicted in FIG. 3. Notice that the hash function H and most of the values in the block header as the hash of the previous block LB and the (current) target δ are system-wide parameters or implicitly given and cannot be changed by the miner. In the following, these parameters are referred to as $\pi_{blckhdr}$. The only input parameters to the hash function that the worker can vary are, directly, a 4-byte nonce nonce and, indirectly, the 32-byte root MR of the Merkle hash tree. The Merkle tree is built over the transactions where the first leaf plays a special role by containing the coinbase transaction. The coinbase transaction contains information about the operator/worker (which can be used so that the mining reward can be claimed afterwards) and also a field (typically of 100 bytes) that can be fully changed depending on the underlying mining pool protocol. This field is referred to in the following by $CB_{nonce}$. Due to its short size, the variability of the 4-byte-value nonce has only a very limited impact on the success probability of a worker to solve the PoW. Hence, according to an embodiment, emphasis is placed on $CB_{nonce}$ herein.

As mentioned earlier, $CB_{nonce}$ is not directly input to the hash function, but affects it implicitly as it influences MR. Thus, the process of solving the PoW is summarized in Algorithm 1 below. Notice that validation here is straightforward: given the block header parameters $\pi_{blckhdr}$ and the value $CB_{nonce}$, one can compute the full block header and check whether its hash value is below the target target.

| Algorithm 1: Work flow for solving the PoW | |
|---|---|
| Input: | Non-changeable block header parameter $\pi_{blckhdr}$ |
| 1: | while PoW not solved do |
| 2: |    Choose a new value for $CB_{nonce}$ to specify the coinbase CB |
| 3: |    Compute the Merkle root MR over the coinbase CB and the set of transactions T |
| 4: |    for nonce ∈ $\{0,1\}^{32}$ do |
| 5: |       Compute h := H($\pi_{blckhdr}$, MR, nonce) |
| 6: |       if h ≤ target then |
| 7: |          break; {Solution found.} |
| 8: |       end if |
| 9: |    end for |
| 10: | end while |
| Output: | The solution sol = ($CB_{nonce}$, nonce) |

When miners do not share the same view in the network (e.g., due to network partitioning), they might work on different blockchains, thus resulting in "forks" in the blockchain. Block forks are advantageously inherently resolved by the system according to an embodiment of the present invention as the longest blockchain will eventually prevail.

One main intuition behind PoW is that for peers to double-spend a given coin, they would have to replace the transaction where the coin was spent and the corresponding block where it appeared in, otherwise their misbehavior would be detected immediately. This means that for malicious peers to double-spend without being detected, they would not only have to redo all the work required to compute the block where that coin was spent, but also recompute all the subsequent blocks in the chain.

Most existing PoW-based blockchains are populated by mining pools that offer a profitable alternative for individual workers to contribute their computing resources and to split the reward between all the pool members following a certain reward payment scheme. Shares of the reward are assigned by the mining pool to its members who present valid proof-of-work. More specifically, mining pools typically set targets between 1 and the currency's difficulty (also referred to herein as pool difficulty level). Subsequently, a share is assigned to those workers that provide a block header that scores a difficulty level between the pools difficulty level and the currency's difficulty level. The main purpose of these block headers is to show that the worker is contributing with a certain amount of processing power. A basic reward payment scheme is the Pay Per Share that offers an instant, guaranteed payout for each share that is solved by a worker. On the other hand, Equalized Shared Maximum Pay Per Share requires that payments are distributed equally among all workers in the pool. Recent Shared Maximum Pay Per Share, on the other hand, gives priority to the most recent Bitcoin workers. A different approach is that offered by a proportional scheme which proposes a proportional distribution of the reward among all workers when a block is found, based on the number of shares they have each found. A variation of this technique is the Pay Per Last N Shares, where rather than counting the number of shares in the round, only the last submitted correct N shares are taken into account. Most existing mining pools adopt two main mining protocols: GBT and TSM.

GBT is a mining pool protocol natively supported in Bitcoin. In this protocol, the mining pool operator orchestrates task assignment to the various connected workers. The GBT protocol gives workers some degrees of freedom in choosing some PoW parameters while still ensuring that no two workers work on towards the same PoW solution.

Figure 4:
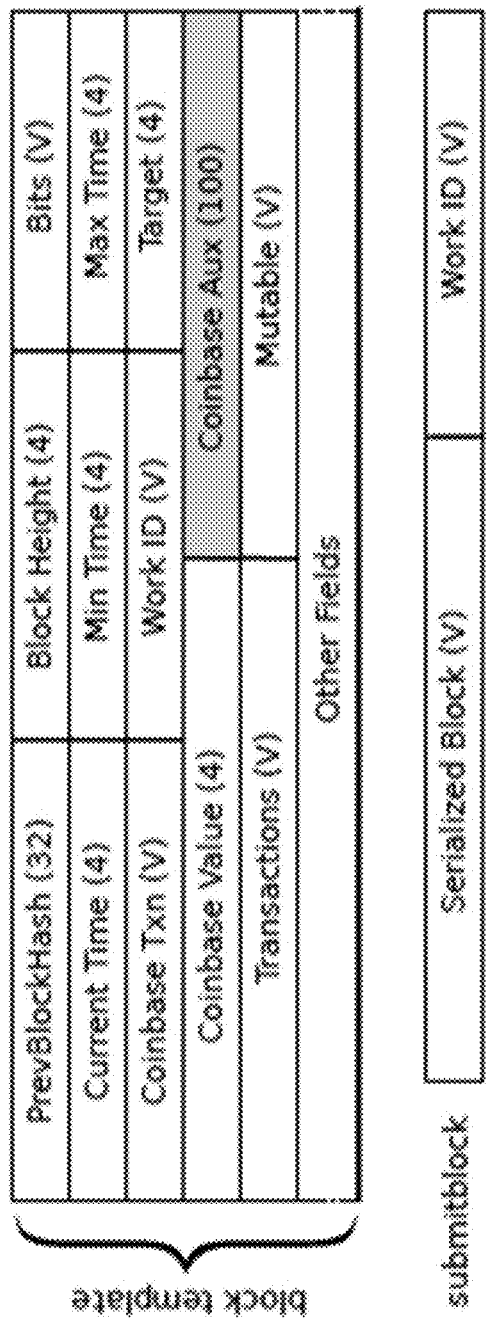
FIG. 4 is a sketch of a GBT work template and a corresponding worker response.

More specifically, upon request, the pool operator outsources to its workers a block template (cf. FIG. 4) that contains the following fields: previous block hash, block height, list of transactions, the target, the coinbase transaction, and time, among others. The field CoinbaseAux contains auxiliary information given by the pool operator which is used by the worker to populate parts of the coinbase transaction. Notice that the worker can add up to around 100 bytes of arbitrary data to the coinbase transaction, which is commonly used by workers as an extra nonce when searching for PoW solutions.

The worker then constructs the Merkle root of all transactions (including the modified coinbase transaction) and searches for a 4 byte nonce to solve the PoW according to the pool difficulty specified in the field Target. If no solution can be found, the worker restarts as shown in Algorithm 1. Notice that a worker can freely modify or shuffle the transactions in the block and compute the corresponding Merkle tree accordingly; this gives workers additional flexibility when solving their tasks.

Once a solution is found, the worker constructs the corresponding block header (cf. FIG. 3), appends it to the full corresponding block (including all transactions), serializes the result, and submits the serialized block along with his worker ID back to the pool operator.

Figure 5:
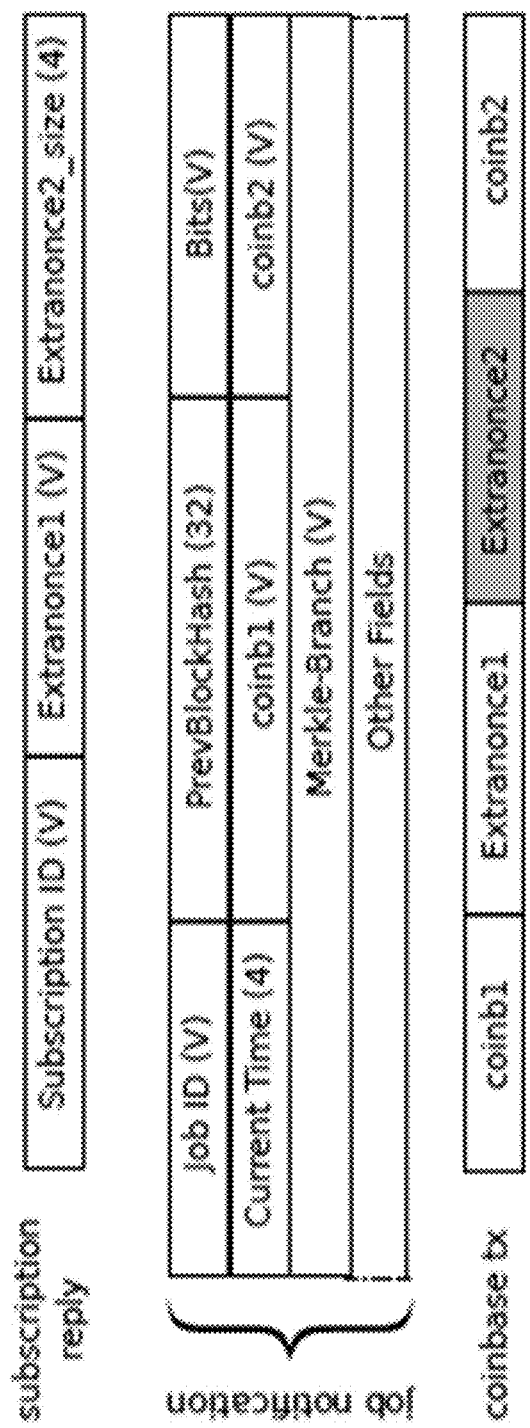
FIG. 5 is a sketch of an STM work template and a corresponding worker response.

STM is one of the most commonly adopted mining pool protocols. In STM, workers first receive the value of Extranonce1 and the size of Extranonce2 from the pool operator right after the initial subscription to the mining pool. Subsequently, the workers are regularly notified of new mining work with templates consisting of coinbase data, the block version, the difficulty, the time, the prefix (coinb1), suffix (coinb2) of the coinbase transaction, and the Merkle tree branches among other information (cf. FIG. 5). Unlike GBT, the pool operator here fixes all the transactions to be confirmed in the PoW excluding the coinbase transaction. The workers only receive the sibling paths of the coinbase transaction in the transaction Merkle tree, which is enough to compute the Merkle root once the coinbase transaction is determined.

The worker then proceeds to searching for the value Extranonce2 which results in a Merkle root that solves the PoW. The resulting coinbase transaction is then formed by appending the following information: (coinb1||Extranonce1||Extranonce2||coinb2), where Extranonce2 is generated locally by each worker. As such, the STM protocols gives workers the flexibility to cycle through the 32-bit nonce and the Extranonce2 field in the coinbase transaction whose size is determined by the pool operator during the subscription stage. Similar to GBT, workers can additionally adjust the timestamp and the nonce in the block header to gain additional flexibility.

Figure 6:
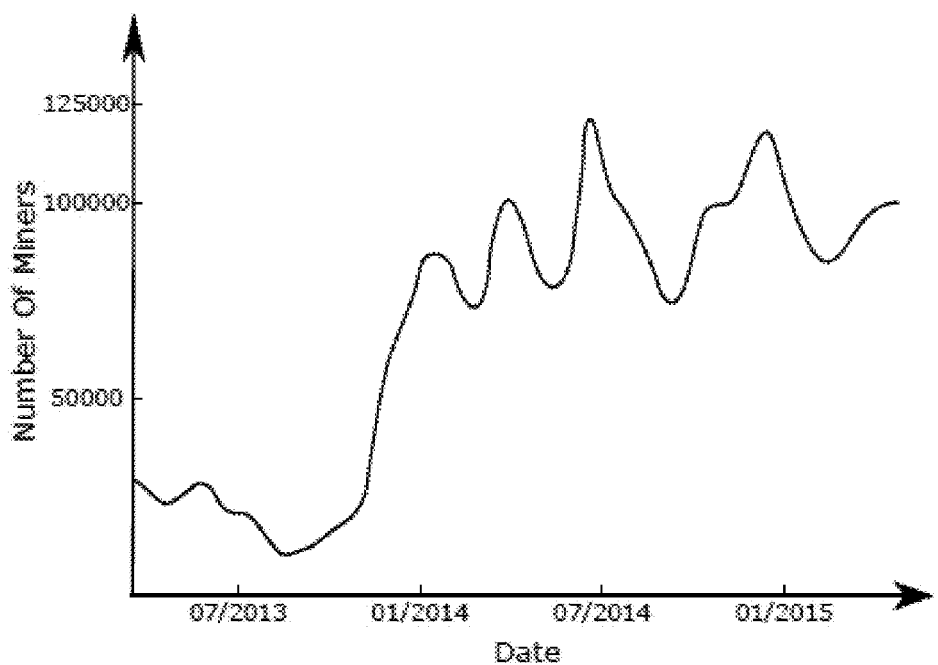
FIG. 6 is a graphical representation of an evolution of an estimated number of Bitcoin miners over time with the workers also being considered miners for the purposes of this graphical representation.
Figure 7:
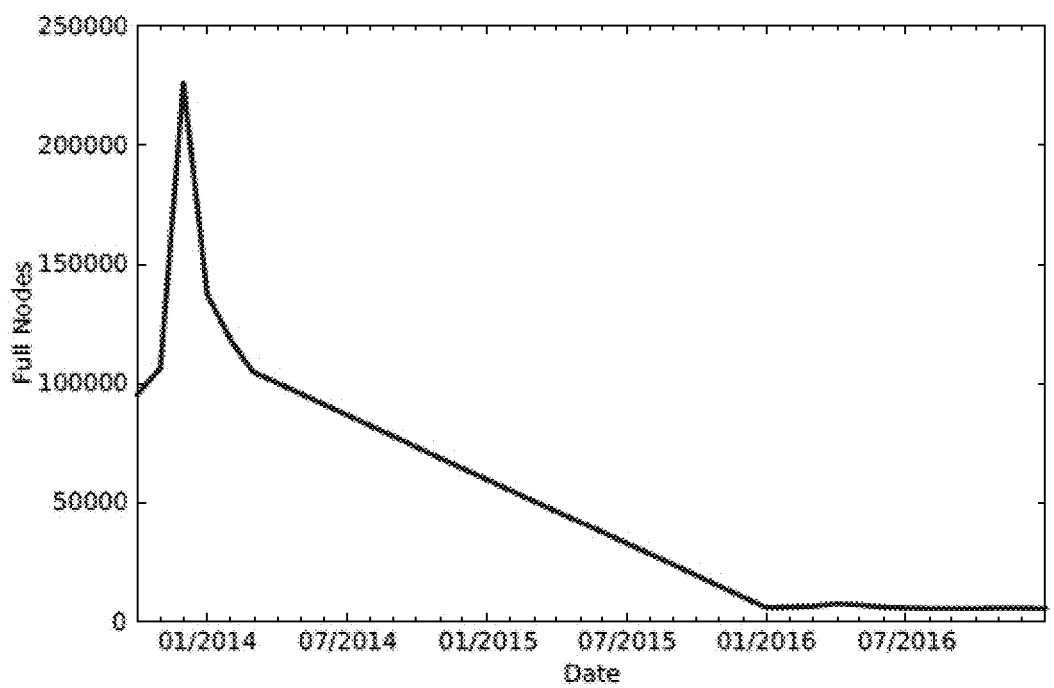
FIG. 7 is a graphical representation of and evolution of an estimated number of Bitcoin full nodes over time.

PoW mining is strongly incentivized by coinbase transactions and fee collections in the system. For example, each block generation in Bitcoin currently awards miners a fixed revenue of 12.5 BTCs (almost 17,500 USD) and a variable profit of 0.7 BTCs (almost 1,000 USD). This has lead to a considerable surge in the number of miners/workers over the last couple of years (cf. FIG. 6). Unlike mining, where participants are rewarded for confirming transactions, running a full node and storing the full blockchain does not provide any incentive. As shown in FIGS. 6 and 7, in the early years of adoption of PoW blockchains, the system started in a well-balanced state; most miners were basically full nodes that store the full blockchain. Later on, with the proliferation of dedicated mining hardware, the surge of mining pools and lightweight clients, and the increase of the blockchain storage size, the mining process was almost completely decoupled from serving as a full node. This ecosystem change then outlined a lack of foresight in designing incentive mechanisms in existing PoW blockchains.

For instance, as shown in FIG. 7, the number of full Bitcoin nodes dropped from 200,000 in 2014 to approximately 5,000 in 2016. Given lack of incentives, this number is only expected to decrease in the future. Although developers allow nodes to "prune" the blockchain, thereby freeing considerable space on their hard drive, nodes still need to download the full blockchain before pruning actually happens. Most users nowadays run lightweight clients which do not store the blockchain and only seldomly verify transactions/blocks of interest.

In the following, an embodiment of the present invention is described which introduces an extension of PoW-based blockchains that we refer to as p-covering blockchain, which ensures that the blockchain is stored among the workers with a specified level of redundancy. Before presenting the notion of p-covering blockchains, the background to formalize the notion of PoW-based blockchains is discussed.

First, with respect to the notation and cryptographic primitives that will be used in the following, let $\lambda$ denote the security parameter that determines the level of security and let H denote a cryptographically secure hash function. For a probabilistic algorithm A, it is denoted by $y \leftarrow A(x)$ the event that A on input x outputs y. To capture the notion of computational effort, the notation of steps is used as follows: Let $Steps_A(x)$ denote the number of steps (i.e., machine/operation cycles) executed by algorithm A on input x. Notice that this number may vary given that A is probabilistic. For a finite set S, it is denoted by $x \xleftarrow{\$} S$ the event that x is uniformly sampled from S.

In the following, a short explanation of the basics of puzzle-based blockchains, as relevant hereto, is provided. A blockchain refers to a sequence of data entries, called blocks. A blockchain is maintained by a set of parties $\mathcal{P}$ and represents a data storage where the content is trusted by anyone in $\mathcal{P}$ without the need of a centrally trusted instance. A blockchain is dynamic in the sense that new data, i.e., blocks, are continuously appended (within each time epoch). Formally, a blockchain BC is seen as an array and the i-th block of BC is denoted by BC[i].

A blockchain system is composed of: A blockchain BC, a set $\mathcal{W}$ of workers who maintain the blockchain, and an interactive algorithm Consensus. The workers are considered to be stateful algorithms and it is denoted for $W \in \mathcal{W}$ by, W its state. At each point in time, the blockchain is a sequence of blocks, denoted by BC=[BC[1], . . . , BC[s]] with s=length(BC) being the current length of the blockchain. The Consensus protocol is executed between the parties in $\mathcal{W}$ to commonly agree on the next block Bl of the blockchain. For the sake of simplicity, the set of workers $\mathcal{W}$ is treated as fixed. It is straightforward to extend the definition (and the follow-up discussion) to capture dynamic sets of workers. Furthermore, it is assumed by definition that a worker has as input for its participation into the Consensus protocol both its internal state and the blockchain.

To increase the costs for appending incorrect content to the blockchain, most existing (open) blockchains (e.g., Bitcoin, Litecoin, Ethereum) require the worker to solve a cryptographic puzzle first before appending a block. Roughly speaking, a cryptographic puzzle should be easy to generate, hard to solve, and easy to verify. The discussion here concentrates on three-move-puzzle systems, though other models can be adapted and extended.

For a puzzle system, let $\lambda$ denote the security parameter. A puzzle system is defined by several spaces and procedures. It comprises a puzzle parameter space $\mathcal{PF}_{PS}(\lambda)$, a puzzle space $\mathcal{PS}_{PS}(\lambda)$, a solution space $\mathcal{SS}_{PS}(\lambda)$, and a hardness space $\mathcal{HS}_{PS}(\lambda)$. These spaces specify a publicly known verification parameter $\pi_{veri}$. Moreover, there exist three algorithms $Sample_{PS}$, $Solve_{PS}$, and $Verify_{PS}$ defined as follows:

Sample$_{PS}(\lambda, h, \pi_{puz})$ is a (possibly probabilistic) puzzle instance sampling algorithm. On input the security parameter $\lambda$, a hardness factor $h \in \mathcal{HS}_{PS}$, and a puzzle parameter $\pi_{puz} \in \mathcal{PF}_{PS}$, it outputs a puzzle instance puz $\in \mathcal{PS}_{PS}$.

Solve$_{PS}(\lambda, h, puz)$ is a probabilistic puzzle solving algorithm. On input the security parameter $\lambda$, a hardness factor $h \in \mathcal{HS}_{PS}$ and a puzzle instance puz $\in \mathcal{PS}_{PS}$, it outputs a potential solution sol $\in \mathcal{SS}_{PS}$.

Verify$_{PS}(\lambda, h, \pi_{veri}, puz, sol)$ is a deterministic puzzle verification algorithm. On input the security parameter $\lambda$, a hardness factor $h \in \mathcal{HS}_{PS}$, a puzzle instance puz $\in \mathcal{PS}_{PS}$ and a potential solution sol $\in \mathcal{SS}_{PS}$ it outputs TRUE or FALSE.

A value puz is called a valid puzzle if there exists a puzzle parameter $\pi_{puz} \in \mathcal{PF}_{PS}$ such that $$Pr[puz \leftarrow Sample_{PS}(\lambda, h, \pi_{puz})] > 0.$$

For a given puz, one can efficiently, i.e., with an effort polynomial $\lambda$, decide whether puz is a valid puzzle.

The hardness factor h specifies the effort to solve a puzzle using the Solve$_{PS}$ algorithm while $\lambda$ specifies the difficulty to cheat on the system, i.e., to violate the soundness. To make the notation more simple, the security parameter $\lambda$ and the hardness factor h are omitted according to an embodiment of the invention if they are clear from the context. That is, Sample$_{PS}(\pi_{puz})$ is written instead of Sample$_{PS}(\lambda, h, \pi_{puz})$ and so on.

A puzzle system is designed to be complete and sound. While the notion of completeness is the same for all puzzle systems considered, the definition of soundness may vary. Hence, here only the meaning of completeness is specified and the follow-up discussions are referred to for the respective soundness definitions.

It can be said that a puzzle system PS is complete, if for every hardness factor $h \in \mathcal{HS}_{PS}$ it holds that:

$$Pr\begin{bmatrix} puz \leftarrow Sample_{PS}(\pi_{puz}); sol \leftarrow Solve_{PS}(puz): \\ Verify_{PS}(\pi_{veri}, puz, sol) = FALSE \end{bmatrix} = negl(\lambda) \quad (1)$$

Recall that most public blockchains are currently based on cryptographic puzzles that require a certain amount of work to be solved, i.e., to provide the PoW. The PoW is a cryptographic puzzle that requires a certain amount of work, i.e., computational effort, to be solved. First, a formal definition adapted for an embodiment of the present invention is provided and afterwards a concrete instantiation that is relevant later is described.

A PoW system is a puzzle system as defined above. Hardness space is denoted with $\mathcal{HS}_{PoW}$, the puzzle space with $\mathcal{PS}_{PoW}$, and the solution space with $\mathcal{SS}_{PoW}$. Moreover, there are the three algorithms Sample$_{PoW}$, Solve$_{PoW}$, and Verify$_{PoW}$. The inputs and outputs of these algorithms are defined as above. Note that the number of steps that Sample$_{PoW}$ takes to run in monotonically increasing in the hardness factor h and may exponentially depend on $\lambda$, while Verify$_{PoW}$ should run in polynomial time in $\lambda$.

In addition, soundness means that for any attacker $\mathcal{A}$, the effort to solve a puzzle cannot be lower (up to a function g) than the effort for running the "official" solving algorithm Solve$_{PoW}$.

With respect to a definition for soundness, a PoW system is g-sound if for every PPT adversary $\mathcal{A}$, any $h \in \mathcal{HS}_{PoW}$ and every $\pi_{puz} \in \mathcal{PF}_{PoW}$, it holds that:

$$Pr\begin{bmatrix} puz \leftarrow Sample_{PoW}(\pi_{puz}); sol \leftarrow \mathcal{A}(puz) \\ Verify_{PoW}(\pi_{veri}, puz, sol) = TRUE \wedge \\ \bigwedge Steps_{\mathcal{A}}(h, puz) \leq g(Steps_{Solve_{PoW}}(h, puz)) \end{bmatrix} = negl(\lambda). \quad (2)$$

To illustrate that the formalism captures the PoW used in Bitcoin, it is formally reformulated using the notation just introduced. This PoW, that is referred to hereinafter according to an embodiment of the invention as HPoW, deploys a cryptographically secure hash function $H:\{0,1\}^* \rightarrow \{0,1\}^n$.

The core idea is that the hardness factor h determines a threshold δ, called the target, with $0 \leq \delta < 2^n$. For instance, one could define the hardness space to be a set of integers $\mathcal{HS}_{HPoW} = \{0, \ldots, 2^n\}$ and set the target as target$:= 2^n - h$.

The sampling algorithm Sample$_{HPoW}$ takes as input $\pi_{puz}$ which are the non-flexible parts of the coinbase and combines these with the remaining public, fixed block header values to formulate a puzzle puz. The solving algorithm Solve$_{HPoW}$ is depicted in Algorithm 1. It repeatedly tries (previously untried) values sol $\in \mathcal{SS}_{HPoW} := \{0,1\}^r$ with r being the size of $CB_{nonce}$ until:

$$h(puz, sol) \leq \delta. \quad (3)$$

Notice that HPoW is an id-sound PoW system in the random oracle model (ROM) where id refers to the identity function, i.e., id(x)=x for all inputs x.

To see why, observe that the probability for any sol $\in \mathcal{SS}_{HPoW}$ to be a valid solution is $$\frac{\delta + 1}{2^n},$$

independent of the hash values of the other values in the solution space. As an adversary can only win if she queries the ROM oracle, it follows that an adversary that the success probability of any solving algorithm is directly tied to the number of hash function calls. Thus, the optimal strategy is to retry different hash inputs—which is exactly the procedure of Solve$_{HPoW}$.

Note that the description of HPoW is not a direct one-to-one mapping with the procedure given above as the description omits the step of computing the Merkle tree. Security-wise, this does not have any impact. To see why, one could define a procedure H* based on a hash function H where in H*, first the Merkle tree is computed and then H is applied. It is easy to see that if H is indistinguishable from a random oracle, so is H*. Otherwise, one could use the construction of H* to run a distinguishing attack on H.

A g-sound PoW-based blockchain is a blockchain system where the process of appending a new block requires to solve at least one g-sound PoW. The blockchain is maintained by a set $\mathcal{W}$ of workers. A worker $W \in \mathcal{W}$ is characterized by a string char(W). That is, it holds that W=W' if and only if char(W)=char(W'). The set $\{char(W)\}_{W \in \mathcal{W}}$ yields the puzzle parameter space $\mathcal{PF}_{PoW}$. That is, a puzzle is samples by invoking Sample$_{PoW}$ on char(W) for some worker $W \in \mathcal{W}$. We call such a puzzle a W-puzzle. A worker W can only successfully participate into the Consensus procedure if that worker presents a solution for a W-puzzle.

The underlying PoW system is part of the system parameters of the blockchain system. That is, it is assumed that all parties participating into the blockchain system use the same PoW system and in particular the same puzzle sampling algorithm. Consequently, a potential solution sol provided by one worker for a puzzle puz is only accepted if Verify$_{PoW}$ ($\pi_{veri}$, puz, sol)=TRUE. However, any worker is free to decide how to choose a puzzle parameter. The event that a worker selected $\pi_{puz}$ is denoted by $\pi_{puz} \leftarrow W$. In practice, the puzzle parameter can include, for example, the identity of the worker.

In the following, rational workers are assumed in the following sense: A worker is modelled as a machine that comprises one or several processing units and one local memory. That is, a worker can fetch data and store data to the local memory and can process data units. In addition, a worker can also request data from external data sources (but this is significantly more time consuming than reading from local memory). The overall goal of a rational worker (i.e., the operator of the machine) is to maximize its probability in solving the PoW while minimizing its effort (which translate into costs). Moreover, a worker is unlikely to alter its mining hardware characteristics unless such a move would drastically increase its advantage in solving PoW. For example, solutions that require the re-purposing of PoW, such as Permacoin or Filecoin are less likely to be adopted by workers since they obviate the need for hash-optimized ASICs and FPGAs equipment (that have limited RAM and storage capabilities) and would require investments in different types of machinery (e.g., storage and exponentiation-optimized machinery).

As mentioned earlier, PoW mining is strongly incentivized by monetary rewards. However, the aforementioned model, which captures existing PoW-based blockchains, gives no direct incentives to store the blockchain data. While the blockchain data may be necessary to verify solutions, it is not required to produce possible solutions. That is, workers are only required to invest the necessary amount of computing power to solve the underlying cryptographic puzzle within their dedicated mining pools (which are responsible to verify the solutions). As shown in FIG. 7, this has resulted in a considerable decrease in the number of workers/nodes storing the full blockchain data. In this respect, an embodiment of the invention provides that any secure PoW-based blockchains should ensure a minimum level of replication of blockchain data in the system, otherwise there might be not enough information to verify PoW solutions. This is captured, according to an embodiment, by requiring each worker to store at least parts of the blockchain data in its local memory in order to produce a possible PoW solution. The beauty behind this approach is that it couples the notion of blockchain data storage with the well-incentivized PoW mining process and as such offers an inherent incentive for workers to continuously support the system by storing parts of the blockchain.

To capture the notion of storage, the common concept of knowledge extractors is adopted. A knowledge extractor algorithm $\mathcal{K}$ is given access to an algorithm A, represented by $\mathcal{K}^A$. Note that this access is non-black-box, e.g., $\mathcal{K}$ is allowed to rewind A. It is important to stress that both, $\mathcal{K}$ and A, have only access to the state of A, i.e. no external inputs are allowed.

Consider a PoW-based blockchain system with respect to a g-sound PoW system and a blockchain BC. This blockchain system is said to be p-covering for $0 \leq p \leq 1$ if there exists a knowledge $\mathcal{K}$ such that it holds:

$$Pr[\forall W \in \mathcal{W}, \forall 1 \leq i \leq s : BC[i] \leftarrow \mathcal{K}^W] \geq p. \quad (4)$$

Note that when interacting with $\mathcal{K}$, a worker has no access to external inputs, ensuring that it has access to local memory only. The interpretation is that, for any block, it holds that with a probability $\geq p$ that it can be reconstructed from a randomly selected worker. In other words, p-fraction of workers is ensured to store this block. Notice that the case where p=0 corresponds to existing PoW-based blockchain systems. According to an embodiment of the invention, an efficient p-covering blockchain is provided where p>0 that requires minimal changes to existing PoW blockchains and that is compliant with the specifications of existing mining hardware.

In the following, an embodiment of the invention, also referred to herein as PoWeR, is discussed and analyzed with respect to the improvements it provides to the security of the blockchain and the blockchain network.

Consider the following strawman design which combines the notion of proofs of knowledge with the standard PoW mechanism. To this end, an extension of the PoW-notion is here first introduced that binds a PoW to a file. The core feature is that an algorithm can only efficiently solve a PoW if it has stored a certain file D.

A file-bound PoW is defined in accordance with the following. A PoW is g'=bound to some file D if there exists a knowledge extractor $\mathcal{K}$ such that it holds for every PPT adversary $\mathcal{A}$ and every puzzle parameter $\pi \mathcal{PF}_{PoW}$ that:

$$Pr\begin{bmatrix} puz \leftarrow \text{Sample}_{PoW}(\pi_{puz}); sol \leftarrow \mathcal{A}(puz); \\ \text{Verify}_{PoW}(\pi_{veri}, puz, sol) = \text{TRUE}; \\ \text{Steps}_{\mathcal{A}}(puz) \leq g'(\text{Steps}_{\text{Solve}_{PoW}}(puz)): \\ D^* \leftarrow \mathcal{K}^{\mathcal{A}}: D^* \neq D \end{bmatrix} = negl(\lambda). \quad (5)$$

Note the difference to the g-soundness of a PoW. There, the definition actually gives a lower bound specified by a function g on the effort of any attacker. Here, the definition says that if an attacker aims to have an effort that is below a certain upper bound, specified by g', it has to store the file D. Namely, different types of thresholds can be provided with respect to the time effort an attacker can achieve:

(1) $\text{Steps}_{\mathcal{A}}(puz) \leq g(\text{Steps}_{\text{Solve}_{PoW}}(puz))$ is practically impossible if the blockchain system is g-sound.

(2) $g(\text{Steps}_{\text{Solve}_{PoW}}(puz)) < \text{Steps}_{\mathcal{A}}(puz) \leq g'(\text{Steps}_{\text{Solve}_{PoW}}(puz))$ is possible but only if $\mathcal{A}$ stores the file D if the blockchain system is g'-bound to the file D.

(3) $g'(\text{Steps}_{\text{Solve}_{PoW}}(puz)) < \text{Steps}_{\mathcal{A}}(puz)$ could be possible even without storing the file D.

Moreover, if it is set g'≡0, i.e., the constant 0-function, a PoW that is g'-bound to some file D is simply a PoW. A strawman solution to realize a file-bound PoW is to couple the PoW with a proof of knowledge (PoK) with respect to a file D, being the blockchain BC in our case. A PoK is an interactive protocol, typically realized by a challenge-response protocol. Since checking knowledge of the full blockchain is infeasible, a reasonable approach is to challenge a random selection of blocks of the blockchain such that the response can only be computed if these blocks are presented. For coupling both concepts, a PoW and a PoK, one can proceed as follows:

(1) A worker has to solve a PoW puzzle puz. The solution found by the worker by is denoted by sol.
(2) Compute from sol a PoK-challenge over BC, e.g., by means of a pseudorandom function.

The first part preserves the PoW property while the second part ensures that the worker needs to have access to the file. Moreover, as sol is not predictable (otherwise this would contradict the soundness of the PoW), the same holds for the PoK-challenge created from sol.

Since the "file", i.e., the blockchain, is publicly known, conceptually simple PoKs are possible. For instance, a straightforward approach is to require the hash over a pseudorandom selection of blocks. That is, after the worker has found a solution $CB_{nonce}$ for the PoW, it has to use this value to derive pseudorandomly a set of indices referring to different blocks of the blockchain. Then, the solution for the file-bound PoW would comprise both the value $CB_{nonce}$ and the hash over the selected blocks. Validation is performed as follows: the verifier first checks if $CB_{nonce}$ is a solution for the PoW given the remaining parameters included in the block header. If this verification succeeds, the verifier derives from $CB_{nonce}$ the indexes of the blocks that are challenged and verifies the solution. A summary of this strawman solution is given in Algorithm 2.

---

Algorithm 2 Informal work for solving the strawman solution.

Input: Non-changeable block header parameters $\pi_{blckhdr}$
1: while PoW not solved do
2:     Choose a new value $CB_{nonce}$ to specify the coinbase CB
3:     Compute the Merkle root MR over the coinbase CB and the set of transactions T
4:     for nonce ∈ $\{0,1\}^{32}$ do
5:         Compute h := H($\pi_{blckhdr}$, MR, nonce)
6:         if h ≤ target then
7:             break the WHILE-loop; {Solution found.}
8:         end if
9:     end for
10: end while
11: Set IND := [ ]; {Index set of challenges}
12: for i = 1, ..., l do
13:     Compute index ind := (H($CB_{nonce}$, i) mod s) + 1 {s denotes the current size of the blockchain}
14:     Append ind to IND.
15: end for
16: Let IND = [$i_1$, ... $i_l$]
17: Compute h := H(BC[$i_1$], ... , BC[$i_l$])
Output: the solution sol = ($CB_{nonce}$, nonce, h).

---

This strawman solution does not necessarily satisfy the definition of a p-covering blockchain above. Namely, although this solution ensures that it is g-bound to the blockchain in case that the underlying PoW is g-sound, it does not enforce that different workers store a replicated version of the blockchain. Namely, workers are typically equipped with dedicated mining hardware that only possess limited storage capabilities (typically few GBs of storage and RAM) and cannot store the full blockchain. As a consequence, this solution only ensures that the pool operator (or any other central entity) stores the full blockchain. In fact, one may consider one party that is only dedicated to solving the PoK at the end of the mining process. In any case, there is no guarantee that the workers store any parts of the blockchain. There are currently a handful of mining pools whose operators already store the full blockchain.

To overcome the limitations of the aforementioned strawman solution, a further extension is provided according to an embodiment of the invention for sharding the blockchain storage. Each worker is required to store a part of the file only, also referred to herein as the shard, that is determined by the puzzle. In the following, files that can be naturally divided into smaller parts, e.g., blocks, are considered.

Consider a file D=(D[1], . . . D[$\ell$]). A sharding function shrd is a mapping that accepts inputs s from some input space S and outputs a fraction of the file, i.e., shrd(s)= [D[$i_1$], . . . D[$i_{\ell'}$]] where $1 \leq i_1 < \ldots < i_{\ell'}$ and $\ell' \leq \ell$. For a block D[i], it is stated that D[i] ∈ shrd(s) if shrd(s)=[D[i_1], ..., D[i_{ℓ'}]] and there exists an index $i_j$ such that $i_j=i$.

The sharding function is p-covering with $0 \leq p \leq 1$ if it holds for any block D[i] that:

$$Pr[s \xleftarrow{\$} \mathcal{S} : D[i] \in shrd(s)] \geq p. \qquad (6)$$

According to an embodiment, a variant of file-bound PoW is used where efficiently solving a puzzle puz requires to solve a shard of the file D only. The shards may differ though and are determined by the actual puzzle. For a shards-bound PoW, onsider a PoW that is file-bound to some file D. Moreover, assume a sharding function shrd that is defined on $\mathcal{PS}_{PoW}$. That is, the input space of shrd is the puzzle space of PoW. The PoW is said to be g'—bound to (D, shrd) if there exists a knowledge extractor $\mathcal{K}$ such that it holds for every PPT adversary $\mathcal{A}$, every $\pi_{puz} \in \mathcal{PF}_{PoW}$, and any $h \in \mathcal{HS}_\lambda$ that:

$$Pr \begin{bmatrix} puz \leftarrow Sample_{PoW}(\pi_{puz}); sol \leftarrow \mathcal{A}(puz); \\ Verify_{PoW}(puz, sol) = TRUE; \\ Steps_{\mathcal{A}}(puz) \leq g'(Steps_{Solve_{PoW}}(puz)) : \\ D^* \leftarrow \mathcal{K}^{\mathcal{A}} : D^* \neq shrd(puz) \end{bmatrix} = negl(\lambda). \qquad (7)$$

Notice that by setting shrd(s)=D for all $s \in \mathcal{S}$, a sharding-bound PoW becomes a file-bound PoW.

For independent shards, consider a shards-bound PoW-based blockchain system. It can be stated that this blockchain system ensures independent shards if it holds for any block that the probability of being part of one shard is practically independent of whether it is part of another shard. More precisely, let $\mathbb{E}(W, Bl)$ denote the event that block Bl is part of shard stored by worker W. Ensuring independent shards means formally that any two different rational W, W' $\in \mathcal{W}$ and any block Bl: =BC[i] it holds:

$|Pr[\mathbb{E}(W, Bl) \wedge \mathbb{E}(W', Bl)] - Pr[\mathbb{E}(W', Bl)] \cdot Pr[\mathbb{E}(W', Bl)]| = negl(\lambda)$.

According to an embodiment of the invention, a PoW-based blockchain system that is shards-bound with respect to a p-covering sharding function and with independent shards is provided and provides a number of technical improvements. In particular, consider a PoW-based blockchain system that is shards-bound with respect to a p-covering sharding function and that is shard-separating. Then, this gives a p-covering Blockchain that ensures p-redundancy (see definition with equation (4) above).

Only workers that aim to solve the underlying PoW as fast as possible to compete with other workers are considered. If the underlying PoW is g-sound, a worker practically realizes the $Solve_{PoW}$ algorithm for solving the PoW. Due to the fact that it is shard-bound as well, the worker needs to have access to the shard associated to his specific puzzle. A preferred strategy is for the worker is to have the shard loaded in RAM in order to minimize memory access overhead (from the network or from disk). By the system ensuring independent shards, it is ensured that each worker stores a different shard.

In the following, a concrete instantiation, PoWeR, is presented that practically instantiates a shard-bound PoW. The sharding function defined above can be used in PoWeR, i.e., as part of the specification of PoWeR. According to a particular embodiment, the Bitcoin PoW is adapted into a shards-bound PoW as defined above.

Recall that BC denotes the blockchain and BC[i] the i-th block. For the specification of the sharding function, PoWeR divides the blockchain into chunks with equal chunk size N. That is, BC[1], ..., BC[N] represents the first chunk, BC[N+1], ..., BC[2N] the second chunk, and so on. One core feature of PoWeR is that a shard is defined such that it contains from each chunk exactly one block. That is a shard has the form: one block from first chunk, one block from second chunk, etc. The selection of the block per chunk is realized by a pseudorandom function. Here, the hash function H is used, which function is deployed anyhow. A complete description is given in Algorithm 3. The description is generic based on some input x; in the following paragraphs, the specification of the input x is discussed.

---

Algorithm 3: Sketch of the sharding function shrd in PoWeR.

Input: Value x
1:    shard := [ ] {Initialize an empty shard}
2:    for i = 1, ... , $\lceil \frac{S}{N} \rceil$ do
3:        Compute j := (H(x, i) mod N) + 1 {Specifies which block within the i-th chunk is to be appended to the shard.}
4:        Compute ind := (i − 1) · N + j {Gives the total index of the block to be appended.}
5:        Append(shard, BC[ind]) {Appends the selected block to the shard. If BC[ind] does not exist yet, this command is ignored.}
6:    end for
Output: Shard shard

---

This sharding function provides various advantages:
- The resulting sharding is p-covering for an appropriate probability p>0.
- The sharding process is independent of the current size s of the blockchain BC.
- Although the shards grow over time (this is a consequence of the p-covering requirement), this does not affect or modify the storage of blocks already contained in the shard.
- The parameters can be reasonably chosen to ensure that shard's size fit within the available memory of existing dedicated mining hardware.
- The sharding process does not require any involved computation and supports mechanisms already contained in existing PoW-based blockchains.

The shards-bound PoW in PoWeR is composed of two phases. In the first phase, the workers reach consensus on the exact set (including order) of transactions to be confirmed in a given block. In the second phase, the workers solve a variant HPoW based on this set that entangles the PoW with a PoK on their specific shard. In the following, these phases are explained in detail.

Fixing the shard: Recall that the transactions exclude the coinbase transaction CB. In the following, it is assumed that the coinbase transaction is divided into two parts CB=(CB1, CB2) conforming with the operation of GBT and STM. While splitting can be chosen arbitrarily later splits are proposed for concrete schemes. Each of these parts of CB plays a different role in PoWeR. The first part, $CB_1$, determines the shard to which the PoW is bound. It is stated shard: =$shard_{CB_1}$: =shrd(H(CB1)). The second part, $CB_2$, is used as input for solving the PoW in the second phase.

First phase, fixing the transactions: Assume a set of transactions T* that are candidate for inclusion in the next block. The goal of this first phase is to reach consensus amongst workers of the same mining pool on the set (including order) of transactions to be used in the second phase. It has been shown that this phase particularly enforces workers to operate all over the same set of transactions. To achieve such consensus while leveraging existing mining hardware/-software, PoWeR deploys the same hash-based PoW as explained above and a target $\delta_{trans}$. Here, a set of transactions T together with a specified order is said to be valid (with respect to T*) if there exists a nonce $nonce_{trans}$ such that:

$$H(T, nonce_{trans}) \leq \delta_{trans}. \quad (8)$$

In summary, the task of a worker in the first phase is to find a valid set of transactions together with the corresponding nonce $nonce_{trans}$.

Second phase, mining a block: Given a set of block header parameters $\pi_{blckhdr}$ and a valid set of transactions T together with an appropriate value $nonce_{trans}$, the second phase mainly deals with the generation of the appropriate block header that solves a specific hash-based PoW with respect to T. To this end, PoWeR adopts a core feature from HPoW but entangles it with in-memory proofs of knowledge of the shard $shard_{CB_1}$: =shrd(H (CB$_1$)).

Let MR(CB, T) denote the root of the Merkle tree where CB defines the first leaf and the following leaves are specified by T. Recall that CB$_1$ (part of CB) determines the shard per worker. The task is now to find a value CB$_2$ and a nonce nonce such that:

$$H(\pi_{blckhdr}, MR(CB_1, CB_2), T), nonce) \leq target. \quad (9)$$

Here, the value CB$_2$ has the form CB$_2$=(nonce$_{trans}$, CB$_{nonce}$), where nonce$_{trans}$ is output by the first phase and only the second value, CB$_{nonce}$, can be varied. To couple this PoW with a PoK over the shard $shard_{CB_1}$, the values of CB$_{nonce}$ are derived from the blocks of the shard as follows.

Let $f_{trans}$ denote a function (e.g., a cryptographic hash) that derives from a given set of transactions T a characteristic value $\mathcal{V}_T = f_{trans}(T)$. It is assumed that $\mathcal{V}_T$ is computed once initially. The computation of CB$_{nonce}$ involves $\mathcal{V}_T$, the blocks comprising the shard, and a value pn called the pre-nonce (to reflect the fact that it will be used as a seed to determine another nonce):

$$CB_{nonce} := (H(\mathcal{V}_T, shard_{CB_1}[index], pn), pn). \quad (10)$$

Analogous to the first phase, the space of possible pre-nonces is restricted to enforce independent shards. As the PoW is tied to a shard, workers who operate over the same shard share the same restricted nonce space and hence reduce their probability of success. This provides that rational workers choose different shards. To restrict the nonce space, PoWeR enforces an upper bound $\delta_{pre-nonce}$ when choosing pn:

$$pn\ valid \Leftrightarrow pn \leq \delta_{pre-nonce}. \quad (11)$$

The index index that determines which block of the shard is involved in the computation of CB$_{nonce}$ (see Equation 10) is computed using the function:

$$f_{ind}: \{0,1\}^* \to \{0, \ldots, \ell_{shrd}\}, x \mapsto mod\ \ell_{shrd}, \quad (12)$$

where bitstring x is interpreted as a positive integer and $\ell_{shrd}$ denotes the length of the shard, i.e., shard=(shard[0], ..., shard[$\ell_{shrd}-1$]).

Then, the index of the shard block in Equation (10) is defined by:

$$index := f_{ind}(\mathcal{V}_T, pn). \quad (13)$$

In summary, the worker performs the following operations in the second phase of PoWeR:

(1) Choose a previously untried pre-nonce pn $\leq \delta_{pre-nonce}$
(2) Compute index$:= f_{ind}(\mathcal{V}_T, pn)$
(3) Set CB$_{nonce} := (H(\mathcal{V}_T, shard_{CB_1}[index], pn), pn)$
(4) Set CB=CB$_1$, (nonce$_{trans}$, CB$_{nonce}$))
(5) Choose a nonce nonce
(6) Compute h$:= H(\pi_{blckhdr}, MR(CB, T), nonce)$.

If h$\leq$target, a solution is found. The complete solution is then given by CB and nonce together with the valid set of transactions T. An overview of these steps is described in Algorithm 4. The validation of a solution (T, CB, nonce) is straightforward and given in Algorithm 5.

---

Algorithm 4: The algorithm Solve$_{PoWeR}$.

---

Input: The block header parameters $\pi_{blckhdr}$ including target target
and has function H: $\{0,1\}^* \to \{0,1\}^n$, set of transactions T*,
two thresholds $\delta_{trans}$, and $\delta_{pre-nonce}$
Compute Shard
  Split the coinbase CB = (CB$_1$, CB$_2$)
  Compute shard := shrd(H(CB$_1$)).
Find valid set of transactions (first phase)
while No valid set of transitions found do
  Choose a set of transactions T from T* (including an order)
  Choose value nonce$_{trans}$
  if H(T, nonce$_{trans}$) $\leq \delta_{trans}$ then
    Valid set of transactions found. Break WHILE-loop.
  end if
end while
Solve Proof of Work (second phase)
Compute V$_T$ = f$_{trans}$ (T)
While Proof of Work not solved do
  Choose a pre-nonce pn $\leq \delta_{pre-nonce}$
  Compute index index := f$_{ind}$(V$_T$, pn)
  Compute CB$_{nonce}$ := (H(V$_T$, shard[index], pn), pn)
  Set CB = (CB$_1$, (nonce$_{trans}$, CB$_{nonce}$))
  for nonce $\in \{0,1\}^{32}$ do
    Compute h := H($\pi_{blckhdr}$, MR(CB, T), nonce).
    if h $\leq$ target then
      PoW-solution found. Break WHILE -loop.
    end if
  end for
end while
Output: Solution (T,CB,nonce).

---

Algorithm 5: The verification algorithm Verify$_{PoWeR}$

---

Input: Block header parameters $\pi_{blckhdr}$, Possible solution (T,CB,nonce)
Check if set of transactions is valid (first phase)
Parse from CB the value nonce$_{trans}$
if H(T,nonce$_{trans}$) > $\delta_{trans}$ then
  Solution invalid. Abort.
end if
Check Proof of Work solution (second phase)
if H($\pi_{blckhdr}$, MR(CB, T), nonce) > target then
  Solution invalid. Abort.
end if
Check validity of parameters (second phase)
Check if nonce restriction applies
Parse from CB the value CB$_{nonce}$
Parse pn from CB$_{nonce}$
if pn > $\delta_{pre-nonce}$ then
  Solution invalid. Abort.
end if
Check if correct shard block involved.
Compute V$_T$ = f$_{trans}$(T)
Compute index index := f$_{ind}$(V$_T$,pn)
if CB$_{nonce}$ $\neq$ (H(V$_T$, shard$_{CB_1}$ [index],pn), pn) then
  Solution invalid. Abort.
end if

---

In practice, the computation of the shard will be done only once by each worker. To ensure efficient execution of phases 1 and 2, the workers are likely to load their respective shards in RAM. This is a reasonable assumption given that it has been described herein how to realize modest shard sizes (with approximately few hundred MBs) that can easily fit into the available RAM of most existing mining hardware.

Notice, however, that the shard size will grow with the length of the blockchain. In this case, workers will continuously update their shards using the noninteractive deterministic sharding function specified in Algorithm 3. However, although the shards grow over time, PoWeR ensures that this does not affect or modify the storage of blocks already contained in the shards stored by each worker.

Moreover, it is a good strategy for the operator to distribute the search for a valid set of transactions (phase 1) among the workers in the mining pool. Once one worker succeeded, the solution of phase 1 (i.e., the fixed transaction set) is forwarded to the others who can then immediately start with phase 2. In this sense, Algorithm 4 should not be seen as a representation of the work of a single worker; instead, it summarizes all single processes occurring within a mining pool.

This aforementioned process preferably is instantiated practically by first requiring all workers to solve a GBT work template where all other fields (besides the worker ID, the target difficult, and the set of transactions) are set zero. Once a worker finds a solution for phase 1, that worker reports it in the serialized block output in GBT. For all practical reasons, if a worker is able to find a nonce for the exact set (and order) of transactions reported in the GBT work template, that worker can only submit the nonce and his worker ID back, without the need to serialize the entire resulting block.

Figure 8:
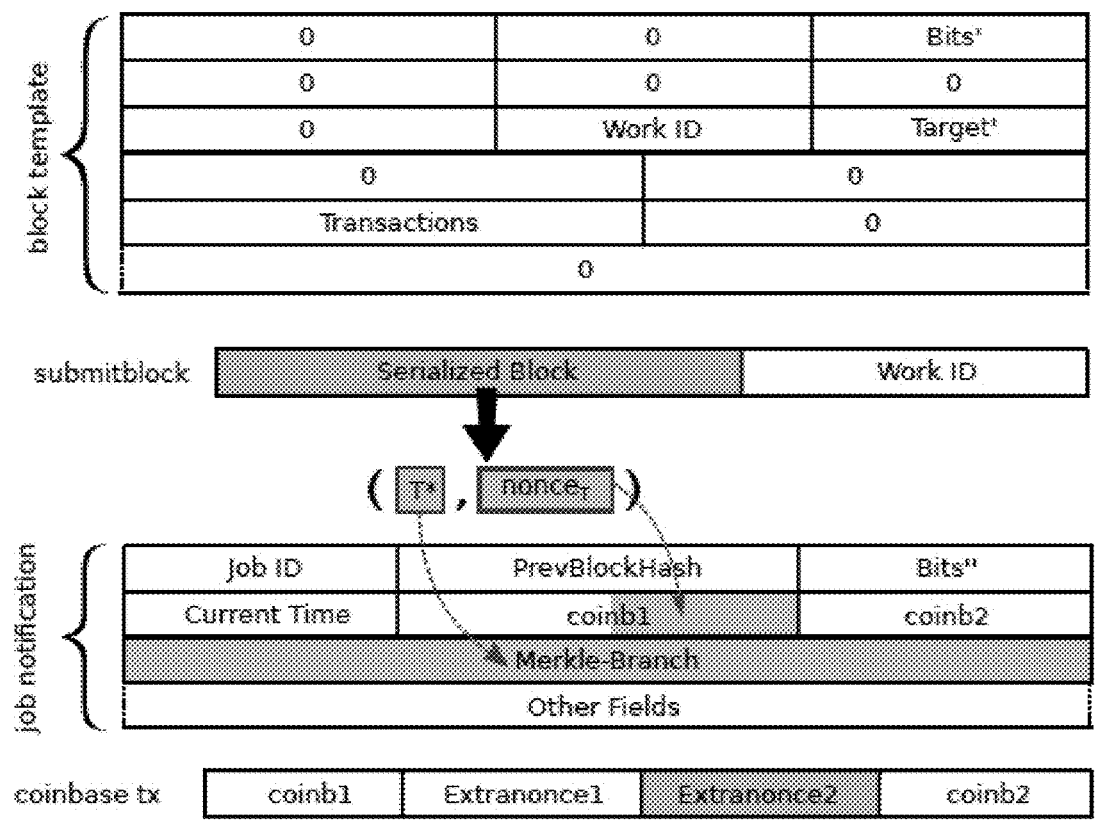
FIG. 8 is a sketch of an instantation of an embodiment or the present invention using GBT and STM work templates.

Given the output of GBT in phase 1, the operator quickly constructs the sibling paths associated with the Merkle root and proceeds similarly to STM. Namely, the operator outsources a work template asking workers to solve the corresponding solution for phase 2. This process is detailed in FIG. 8. This process does not necessarily require a large mining pool and can be equally applied e.g., by a solo miner.

In summary, PoWeR ensures and incentivizes storing the blockchain data in the network using an efficient in-memory proof of knowledge into a standard hash-based PoW mechanism to force workers to store (in-memory) a modest (but fixed) shard of the blockchain data. PoWeR leverages two sequential phases: in the first phase, the workers reach consensus on the exact set (including order) of transactions to be confirmed in a given block. In the second phase, the workers solve a proof of work instantiation based on this set and on their specific shard. As discussed above, PoWeR brings security improvements to the blockchain and the block chain network, only incurs small modifications of existing PoW protocols, and is fully compliant with the specifications of existing mining hardware. The results of implementing PoWeR and integrating it within GBT and STM show that PoWeR can be easily integrated within these protocols and does not impair their mining efficiency.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for integrating a Proof of Storage (PoS) into a blockchain and for increasing security, robustness and/or verifiability of a blockchain network, the method comprising:

receiving, at a first one of a plurality of mining nodes of the blockchain network, a part of the blockchain to be stored;

storing, at the first mining node, the part of the blockchain;

mining, by the first mining node, a new block, wherein the mining is performed so as to enforce that the mining nodes store different parts of the blockchain;

integrating the PoS into the new block; and verifying the PoS before accepting the new block into the blockchain.

2. The method according to claim 1, wherein the part of the blockchain to be stored by the first mining node is selected using a value or identifier that is unique to the first mining node.

3. The method according to claim 1, wherein the part of the blockchain to be stored by the first mining node is expandable based on a current size of the blockchain.

4. The method according to claim 1, wherein the PoS is integrated into the new block using a challenge-response protocol implemented in the first mining node which issues a challenge, the challenge requesting a subset of data contained in the part of the blockchain that was received at the first mining node.

5. The method according to claim 4, wherein the PoS is verified based on the subset of data of the challenge and a response to the challenge incorporated in the PoS being correct.

6. The method according to claim 4, wherein the challenge includes a coinbase transaction that is unique to the first mining node.

7. The method according to claim 6, wherein the challenge includes a timestamp defining a frequency of renewing the PoS.

8. The method according to claim 1, wherein an operator of the blockchain network signs a set of transactions once and distributes the set of transactions to each of the mining nodes.

9. The method according to claim 1, wherein the mining comprises:

searching for a valid set of transactions, wherein a determination that the set of transactions is valid relies on finding a first nonce such that using a cryptographically secure hash function a hash value of the transactions and the first nonce is below a threshold; and then finding a second nonce such that a hash of a block header that includes the valid set of transactions as well as the PoS of the received part of the blockchain is below a threshold.

10. The method according to claim 1, further comprising requiring the first mining node to compute nonces in a predetermined sequential order using a cryptographically secure hash function so as to find a correct nonce.

11. A mining node for integrating a Proof of Storage (PoS) into a blockchain and for increasing security, robustness and/or verifiability of a blockchain network, the mining node comprising a memory and one or more computer processors, which alone or in combination, provide for execution of the following steps:

receiving a selected part of the blockchain to be stored that is unique to the mining node and different from parts of the blockchain received by other mining nodes of the blockchain network;

storing the part of the blockchain in the memory;

mining a new block using a set of transactions signed and distributed by an operator of the blockchain network or by searching for a valid set of transactions, wherein a determination that the set of transactions is valid relies on a coinbase that is unique to the first mining node; and integrating the PoS into a new block to be mined.

12. The mining node according to claim 11, wherein the part of the blockchain to be stored is selected using a pseudo-random selection function and a value or identifier that is unique to the mining node.

13. The mining node according to claim 11, wherein the one or more processors, alone or in combination, are further configured to integrate the PoS into the new block using a challenge-response protocol implemented in the mining node configured to issue a challenge requesting a subset of data contained in the part of the blockchain that was received at the mining node.

14. The mining node according to claim 13, wherein the challenge includes a coinbase transaction that is unique to the mining node.

15. The mining node according to claim 11, wherein the mining node is configured to search for the valid set of transactions using a cryptographically secure hash function such that nonces are computed in a predetermined sequential order.

* * * * *